United States Patent
Cohen et al.

(10) Patent No.: US 7,791,719 B1
(45) Date of Patent: Sep. 7, 2010

(54) USING A FIXED-FREQUENCY OSCILLATION TO DETECT AND MEASURE SCENE INHOMOGENEITY

(75) Inventors: Douglas Lent Cohen, Fort Wayne, IN (US); David James Crain, Grabill, IN (US); Richard James Hertel, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 417 days.

(21) Appl. No.: 12/013,523

(22) Filed: Jan. 14, 2008

Related U.S. Application Data

(60) Provisional application No. 60/880,268, filed on Jan. 12, 2007.

(51) Int. Cl.
G01J 1/56 (2006.01)
G01P 3/40 (2006.01)
(52) U.S. Cl. .................................. 356/217; 356/26
(58) Field of Classification Search ............... 356/217, 356/213, 450–452, 326, 26
See application file for complete search history.

(56) References Cited

U.S. PATENT DOCUMENTS

| | | | |
|---|---|---|---|
| 4,676,642 A | 6/1987 | French | |
| 5,621,526 A | 4/1997 | Kuze | |
| 5,784,158 A | 7/1998 | Stanco et al. | |
| 5,835,214 A | 11/1998 | Cabib et al. | |
| 6,297,504 B1 | 10/2001 | Andreou | |
| 6,816,258 B2 | 11/2004 | Hutchin | |
| 6,836,325 B2 | 12/2004 | Maczura et al. | |
| 7,259,861 B1 * | 8/2007 | Crain et al. | 356/451 |
| 7,355,705 B1 * | 4/2008 | Cohen et al. | 356/326 |
| 2004/0135895 A1 | 7/2004 | Wiedmann | |

OTHER PUBLICATIONS

Choongyeun Cho et al., "Stochastic Cloud Clearing of Hyperspectral Radiances Observed by the Atmospheric Infrared Sounder (AIRS) on the Aqua Satellite", Massachusetts Institute of Technology, Research Laboratory Electronics, 2004.
James B. Abshire et al., "Laser Sounder Approach for Measuring Atmospheric CO2 from Orbit", NASA Goddard Space Flight Center, pp. 1-6.
D. Cohen et al., "Using a Fixed-Frequency Oscillation in a Dispersive Spectrometer to Measure Scene Inhomogeneity" U.S. Appl. No. 11/159,883, filed Jun. 23, 2005, still pending.

* cited by examiner

*Primary Examiner*—L. G Lauchman
(74) *Attorney, Agent, or Firm*—Ratner Prestia

(57) ABSTRACT

An optical system measures scene inhomogeneity. The system includes a mirror for receiving radiance of a field-of-view (FOV) of a scene, and reflecting a portion of the radiance to an optical detector. A controller is coupled to the mirror for changing the FOV. The optical detector provides a signal of the reflected portion of radiance of the scene. A processor determines scene inhomogeneity, based on amplitude of the signal provided from the optical detector. The controller is configured to modulate the FOV at a periodic interval, using a sinusoidal waveform, a pulse code modulated waveform, or a pseudo-random waveform.

20 Claims, 4 Drawing Sheets

USING A FIXED-FREQUENCY OSCILLATION TO DETECT AND MEASURE SCENE INHOMOGENEITY

CROSS REFERENCE TO RELATED APPLICATIONS

This application claims priority of U.S. Provisional Patent Application No. 60/880,268 filed Jan. 12, 2007, and is incorporated herein by reference in its entirety.

The present invention is related to U.S. application Ser. No. 11/159,883 filed on Jun. 23, 2005, by the same inventive entity, and is incorporated herein by reference in its entirety.

TECHNICAL FIELD

The present invention relates, in general, to a method and apparatus for observation of atmospheric spectra or scene spectral radiance. More specifically, the present invention relates to a method and apparatus for measuring scene inhomogeneity, by adding a repetitive pattern of line-of-sight (LOS) oscillation to a field-of-view (FOV) of an optical instrument.

BACKGROUND OF THE INVENTION

Conventional optical packages assume that the scene radiance does not vary while it is being analyzed. If the scene radiance does in fact vary—for example, because the line-of-sight (LOS) of the instrument changes for an inhomogeneous scene—then the radiance may not be analyzed accurately. If the LOS change is random, this can become a significant source of analysis error. When sounding planetary atmospheres, scene inhomogeneity due to the presence of clouds is a significant source of noise or uncertainty. Conventional sounding or retrieval algorithms attempt to remove inhomogeneity using methods called "cloud clearing," "hole hunting," and various cloud-mask methods. None of these methods, however, can unambiguously determine the degree of scene inhomogeneity for an individual field-of-view (FOV) because they require the observation of multiple or adjacent fields of view. Determining the degree of scene inhomogeneity for each observed instrument FOV independent of cloud-clearing or other method may significantly improve the accuracy of the sounding algorithms used to retrieve atmospheric parameters of interest. Knowing that the FOV contains a homogeneous scene also permits neglecting the effect of small, uncontrollable, and random LOS changes on the radiance and sounding analysis.

SUMMARY OF THE INVENTION

To meet this and other needs, and in view of its purposes, the present invention provides an optical system for measuring scene inhomogeneity. The system includes a dichroic mirror for receiving radiance of a field-of-view (FOV) of a scene, and reflecting a portion of the radiance to an optical detector. A controller is coupled to the mirror for changing the FOV. The optical detector provides a signal of the reflected portion of radiance of the scene. A processor determines scene inhomogeneity, based on amplitude of the signal provided from the optical detector. The controller is configured to modulate the FOV at a periodic interval, using a sinusoidal waveform, a pulse code modulated waveform, or a pseudo-random waveform.

Another embodiment of the invention is a method for measuring scene inhomogeneity. The method includes the steps of (a) directing radiance of a scene into an optical instrument; (b) changing a field-of-view (FOV) of the optical instrument, while directing the radiance of the scene toward an optical detector; (c) processing the detected radiance of the scene to obtain a signal; (d) measuring an amplitude of the signal; and (e) determining scene inhomogeneity based on the measured amplitude of the signal.

Yet another embodiment of the invention is an optical system for measuring scene inhomogeneity. The system includes a dichroic mirror for receiving radiance of a field-of-view (FOV) of a scene, and reflecting a portion of the radiance to an optical detector. A controller is coupled to the mirror for changing the FOV. The optical detector provides a signal of the reflected portion of radiance of the scene. A processor determines scene inhomogeneity, based on amplitude of the signal provided from the optical detector. The controller is configured to change the FOV at a periodic interval, using one of a sinusoidal waveform, a pulse code modulated waveform, or a pseudo-random waveform. The processor is configured to determine scene inhomogeneity, based on the signal provided from the optical detector having a waveform corresponding to the respective sinusoidal waveform, the pulse code modulated waveform, or the pseudo-random waveform. The optical detector includes a focal planar array (FPA) for detecting the radiance of the scene and providing multiple output signals from the FPA, and the processor includes an adder for summing the multiple output signals from the FPA. The processor is configured to determine that the secne is inhomogeneous, when the amplitude of the signal is larger than a noise component of the signal. The processor is configured to determine that the scene is homogeneous, when the measured amplitude of the signal is equal to or smaller than the noise component of the signal. The processor includes a module for calculating a Fourier transform of the signal provided from the optical detector.

Still another embodiment of the present invention is a system for determining scene inhomogeneity. The system includes a mirror for receiving and reflecting radiance of a scene toward an optical detector. A controller oscillates the mirror at a predetermined frequency, while receiving and reflecting the radiance of the scene. The optical detector includes a focal planar array (FPA) for detecting the radiance of the scene. The optical detector provides a signal proportional to the predetermined frequency, and the signal is used to determine scene inhomogeneity. The system includes aft optics disposed between the mirror and the optical detector for focusing the radiance of the scene onto the FPA. A motor is configured to oscillate the mirror at the predetermined frequency, and a controller synchronizes the motor at the predetermined frequency and synchronizes the signal at the predetermined frequency. A processor is coupled to the FPA, where the processor is configured to determine that the scene is inhomogeneous, when an amplitude of the signal is larger than a noise component of the signal. The processor is configured to determine that the scene is homogeneous, when the measured amplitude of the signal is equal to or smaller than the noise component of the signal.

It is understood that the foregoing general description and the following detailed description are exemplary, but are not restrictive, of the invention.

BRIEF DESCRIPTION OF THE DRAWINGS

The invention is best understood from the following detailed description when read in connection with the accompanying drawings.

DETAILED DESCRIPTION OF THE INVENTION

If a small, uniform oscillation is placed on an optical instrument's line-of-sight (LOS), and the instrument is observing a scene which is inhomogeneous at the edges of the field-of-view (FOV), then the output may include an oscillating signal whose amplitude is proportional to the degree of scene inhomogeneity present in the scene. When this oscillation is small or undetectable, then the scene is only slightly inhomogeneous. It is probably cloud-free or covered by the same type of cloud layer. If the opposite is true, then the scene is significantly inhomogeneous, probably having a relatively large fraction of the FOV filled with different types of cloud or other sources of distinct radiances.

Figure 2:
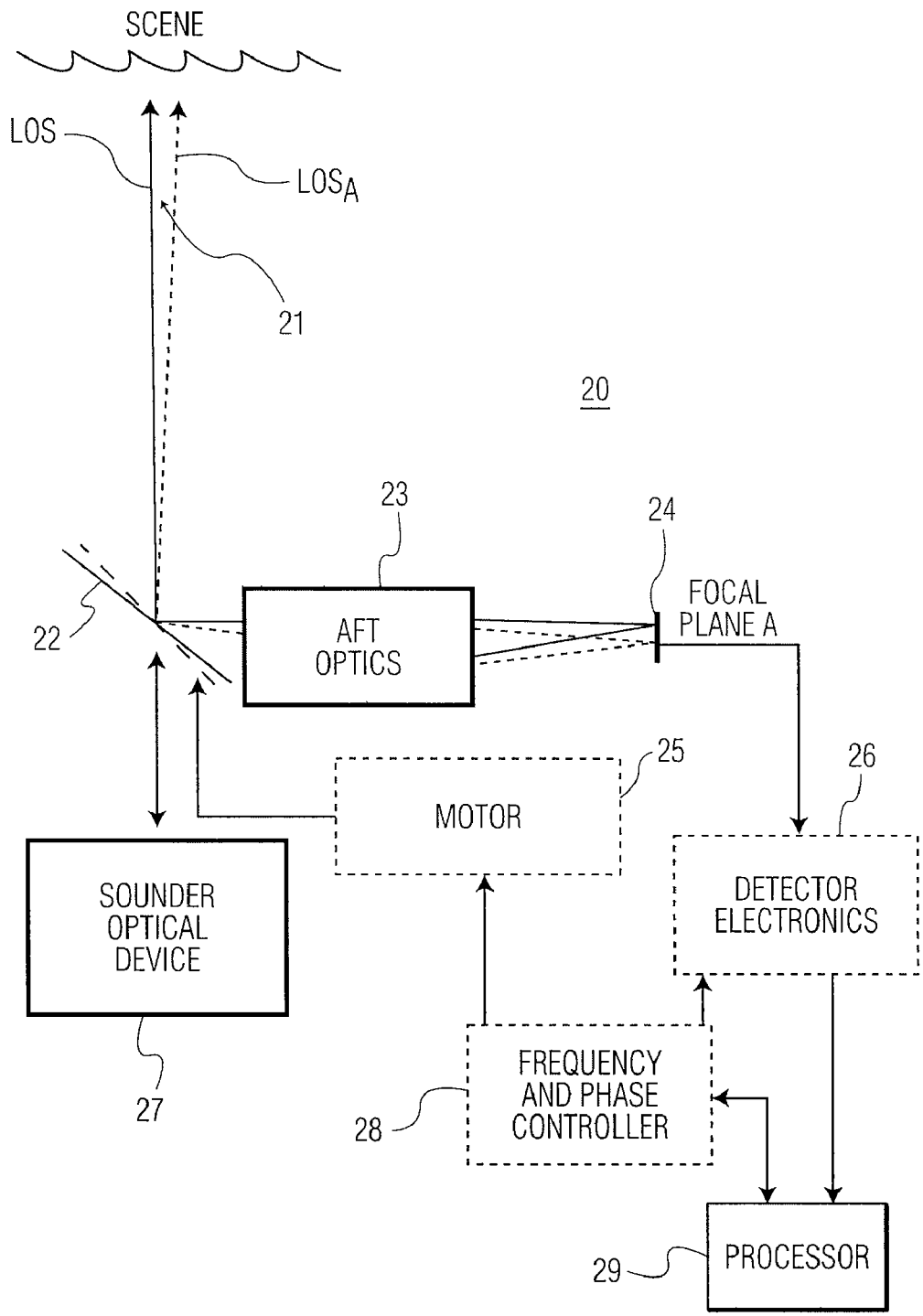
FIG. 2 is a block diagram of an exemplary optical system, in accordance with an embodiment of the present invention.

Referring to FIG. 2, sounder optical device 27 receives scene radiance, shown as an optical beam transmitted through mirror 22. The optical beam is transmitted, as shown, by way of a line-of-sight (LOS) to the scene. Mirror 22 is configured to transmit (pass through) any long wavelength radiation for measurements by the sounder optical device. The mirror, however, is configured to reflect to aft optics 23 any short wavelength radiation observed from the scene. As motor 25 oscillates mirror 22, the LOS is also oscillated, as shown by $LOS_A$. The radiation reflected from mirror 22 is focused by aft optics 23 onto focal plane A, designated as 24. The angle through which focal plane A sees the oscillated field-of-view is designated as 21.

It will be understood that the field-of-view observed by sounder optical device 27 does not change, because the sounder optical device is configured to observe the scene using radiation transmitted through mirror 22. The observed short wavelength radiation, because it is reflected by oscillating mirror 22, does oscillate on focal plane A, as shown in FIG. 2. The oscillation frequency, for example, may be $f_0$.

A frequency and phase controller, designated as 28, controls the oscillation of mirror 22 by way of motor 25. Detector electronics 26, receiving a charge from a single detector or pixel residing at focal plane A, or receiving several charges from an array of detectors or pixels residing at focal plane A, detects signal current proportional to the charge or charges. The detected current is also oscillating at the same frequency as the oscillating frequency of the mirror. The detected current may be synchronized to the oscillating frequency by way of controller 28. Processor 29 receives the signal current and computes a degree of homogeneity or a degree of inhomogeneity of the scene observed by system 20.

To give mathematical structure to the present invention, a mathematical model is derived below for a signal generated at focal plane A for system 20 shown in FIG. 2. It will be appreciated, however, that any optical system may be used to observe the scene radiation. In the example shown in FIG. 2, system 20 utilizes sounder optical device 27, and a mirror is placed in the optical path to reflect scene radiance to aft optics 23. It will be appreciated, however, that the sounder optical device is not necessary to the present invention. Only a detector, or multiple detectors, residing at a focal plane, configured to observe radiance of a scene reflected from an oscillating mirror is required for the present invention.

The detector or pixel at focal plane A, designated as 24, collects photons at wavelengths between $\lambda$ and $\lambda+\Delta\lambda$. The detector or pixel absorbs a photon flux F such that $$F(T) = \Lambda_b + \left[\eta \cdot \tau \cdot \left(\frac{\lambda}{hc}\right) A_e \cdot \Omega \cdot B(\lambda, T) \cdot \Delta\lambda\right] \quad (1a)$$

when the instrument is observing Planck radiance at temperature T and the detector on focal plane A is experiencing a background photon flux of $\Lambda_b$. The photon flux F has units of photons/sec and T is in deg K. The instrument's entrance aperture has an area $A_e$ in cm², and $\Omega$ is the solid angle of the FOV (in steradians) of the detector on focal plane A. The dimensionless optical transmission from the entrance is aperture to the focal plane is $\tau$, and the dimensionless quantum efficiency of the focal-plane detector is $\eta$. Planck's constant is $h \approx 6.625 \times 10^{-27}$ erg·sec and the speed of light is $c \approx 2.998 \times 10^{10}$ cm/sec.

The formula for the Planck radiance in empty space is (in units of erg/sec/cm³/ster)

$$B(\lambda, T) = \frac{2hc^2}{\lambda^5 \left(e^{\frac{hc}{\lambda kT}} - 1\right)}. \quad (1b)$$

In equations (1a,b), the wavelength $\lambda$ and wavelength interval $\Delta\lambda$ are in cm.

Figure 1:
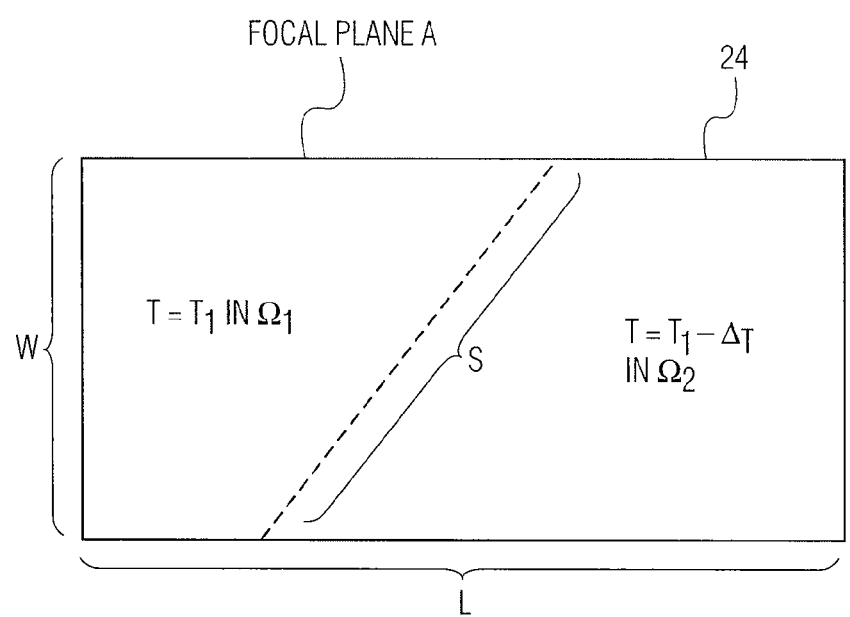
FIG. 1 is a planar view of an exemplary field-of-view (FOV) seen by an optical instrument for measuring scene inhomogeneity, in accordance with an embodiment of the present invention.

Referring now to FIG. 1, there is shown a FOV of a detector disposed at focal plane A. As shown, the FOV is rectangular, with L and W being the length and width, respectively (both are in radians) of the FOV seen by the detector, or pixel.

To explain how this works with a simple inhomogeneous scene, assume that a boundary of length s, which is a straight line for purposes of explanation, divides the original $\Omega$ solid angle of the FOV into two smaller solid angles called $\Omega_1$ and $\Omega_2$. The effective black-body temperature of the Plank radiance coming from $\Omega_1$ is $T_1$ and the effective black-body temperature of the Planck radiance coming from $\Omega_2$ is $$T_2 = T_1 - \Delta T. \quad (2a)$$

The three solid angles are in steradians, all temperatures are in deg K, and $T_1$ is assumed to be greater than or equal to $T_2$. When the mirror is not oscillating, $\Omega_1$ has the value $\Omega_1^0$ and $\Omega_2$ has the value $\Omega_2^0$.

Referring again to FIG. 2, motor 25 is configured to oscillate the LOS at frequency $f_0$, with a component of this oscillation perpendicular to the boundary of length s. Now $\Omega_1$ and $\Omega_2$ are functions of time t with $$\Omega_1(t) = \Omega_1^{(0)} + s\theta_0 \cos(2\pi f_0 t) \quad (2b)$$

and $$\Omega_2(t) = \Omega_2^{(0)} - s\theta_0 \cos(2\pi f_0 t) \quad (2c)$$

where $\theta_0$ is the amplitude (in radians) of the oscillation component perpendicular to the boundary. If the LOS swings so that $\Omega_1$ increases, then $\Omega_2$ decreases; and if it swings so that $\Omega_2$ increases then $\Omega_1$ decreases. Consequently, as shown by equations (2a) and (2b), $$\Omega_1(t)+\Omega_2(t)=\Omega_1^{(0)}+\Omega_2^{(0)}=\text{constant.}$$

The total size of the FOV does not change from its original $\Omega$ value when the LOS changes, so $$\Omega_1(t)+\Omega_2(t)=\Omega_1^{(0)}+\Omega_2^{(0)}=\Omega. \tag{2d}$$

Note that, for small oscillations, equations (2a-d) apply to any shape FOV, where the LOS is changing across a straight-line boundary of length s, not just rectangular FOVs where $$\Omega = WL. \tag{2e}$$

When the LOS oscillates at frequency $f_0$, the formula for the photon flux is no longer given by equation (1a), but instead by $$F = \Lambda_b + \eta \cdot \tau \cdot \left(\frac{\lambda}{hc}\right) A_e \cdot \Delta\lambda \cdot [\Omega_1(t)B(\lambda, T_1) + \Omega_2(t)B(\lambda, T_2)]$$

which, substituting from equations (2a-c) becomes $$F(t,T_1,\Delta T) = \Lambda_b + \alpha[\Omega_1^{(0)}B(\lambda,T_1)+\Omega_2^{(0)}B(\lambda,t_1-\Delta T)]$$
$$+\alpha\, s\, \theta_0 \cos(2\pi f_0 t)\cdot[B(\lambda,T_1)-B(\lambda,t_1-\Delta T)] \tag{3a}$$

where $$\alpha = \eta \cdot \tau \cdot A_e \cdot \left(\frac{\lambda}{hc}\right) \cdot \Delta\lambda \tag{3b}$$

and the photon flux F has been written as a function of t, $T_1$, and $\Delta T$.

The electric current I leaving the detector on focal plane A is proportional to F with constant of proportionality R, so it too may be written as a function of t, $T_1$, and $\Delta T$ giving $$I(t,T_1,\Delta T) = R \cdot F(t,T_1,\Delta T)$$

which, after substituting from equation (3a), becomes $$I(t,T_1,\Delta T)=R\Lambda_b+\alpha R[\Omega_1^{(0)}B(\lambda,T_1)+\Omega_2^{(0)}B(\lambda,T_1-\Delta T)]$$
$$+\alpha R\, s\, \theta_0 \cos(2\pi f_0 t)\cdot[B(\lambda,T_1)-B(\lambda,T_1-\Delta T)]. \tag{4a}$$

The signal current I includes noise, which may be larger than the naturally occurring photon noise, but is never smaller. To detect the presence of an inhomogeneous scene, system 20 shown in FIG. 2 detects the time-varying signal component $$\alpha\, R\, s\, \theta_0 \cos(2\pi f_0 t)\cdot[B(\lambda,T_1)-B(\lambda,T_1-\Delta T)]$$

in the presence of photon noise. Doing this requires taking the Fourier transform of I and then confirming that its $f_0$ frequency component is significantly larger than its photon-noise value.

As shown in FIG. 2, system 20 examines the scene, while oscillating the LOS of the mirror at frequency $f_0$ for a time $\Delta t$. Under these circumstances, the signal-to-noise ratio (SNR) for detecting scene inhomogeneity in the presence of photon noise is $$SNR = \alpha s \theta_0 \sqrt{\frac{\Delta t}{2F_{tot}}} \cdot [B(\lambda, T_1) - B(\lambda, T_1 - \Delta T)] \tag{4b}$$

where $$F_{tot} \approx \Lambda_b + \alpha[\Omega_1^{(0)}B(\lambda,T_1)+\Omega_2^{(0)}B(\lambda,T_2)] \tag{4c}$$

is the total photon flux, from both the scene and background, absorbed by the detector pixel.

The system next calculates the SNR predicted by equation (4b) using parameter values from a typical sounding spectrometer in a low earth orbit (LEO). For an exemplary optical instrument L=0.001 rad.

and the FOV width is

W=0.001 rad.

The length of the boundary in FIG. 1 is set to its minimum possible value s=0.001 rad, and the oscillation amplitude $\theta_0$ which is perpendicular to the boundary is taken to be 1% of the FOV side length. In other words, $\theta_0$=0.00001 rad.

The dwell time is $\Delta t$=20 millisec.

and the frequency of the LOS oscillation is $f_0$=500 Hz resulting in ten oscillations during a dwell time.

It will be understood that there is nothing special about the size of $f_0$ so long as it is reasonably large in comparison to the dwell time and the LOS oscillation may be arranged to occur at the chosen frequency. The dimensionless $\tau$ and $\eta$ parameters in equations (1a) and (3b) are given exemplary values typical of this sort of instrument, $\tau$=0.7 and $\eta$=0.7.

The area of the entrance aperture in (1a) and (3b) is $A_e \approx 20.27$ cm$^2$ for the wavelength $\lambda=4$ μm at which the SNR in equation (4b) is evaluated. The value of $\Delta\lambda$ is 1 micron, and the background $\Lambda_b$ is small compared to the scene photons. Equation (4c) for $F_{tot}$ may then be reduced to $$F_{tot} \approx \alpha[\Omega_1^{(0)}b(\lambda,T_1)+\Omega_2^{(0)}B(\lambda,T_2)].$$

When $\Delta T=T_1-T_2$ is relatively small, a further approximation may be made that $$F_{tot} \approx \alpha WL\Omega_1^{(0)}B(\lambda,T_1).$$

These parameter values may then be applied to the SNR formula in equation (4b).

Figure 3:
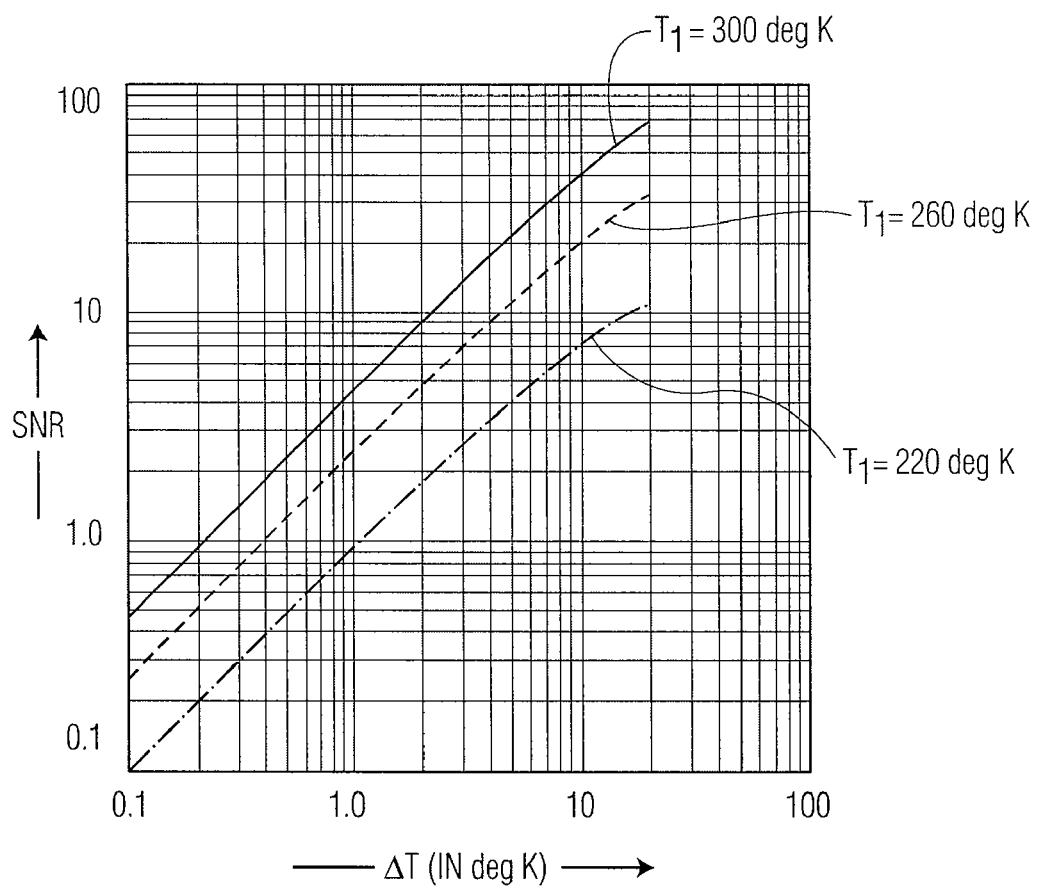
FIG. 3 is a plot of signal to noise ratio (SNR) versus change in temperature in degrees Kelvin, as seen by an optical instrument, in accordance with an embodiment of the present invention.

FIG. 2 shows one possible embodiment of system 20 to generate an oscillating LOS. FIG. 3 gives the SNR curves for three different $T_1$ values: 300 deg K, 260 deg K, and 220 deg K. For all three temperature plots, a scene inhomogeneity of the type shown in FIG. 1 is easily detectable for $\Delta T$ values greater than 4 deg K, since by then the plotted SNR values are well above three (3), which is considered to be a reliable threshold of detection.

It should now be evident, after considering the above example of an oscillating LOS to detect scene inhomogeneities, that any small, predictable set of changes in the LOS may be used in place of a cosine oscillation described thus far. A few of the many oscillation possibilities available are, for example, pulse-code modulation, any type of periodic waveform oscillation, or a known pseudo-random pattern oscillation.

The above described example is for the infrared region of the electromagnetic spectrum. It is however, possible to configure a similar system that works in the visible region, using detectors measuring optical signals in the visible spectrum. The same procedure may detect scene inhomogeneities for any band of electromagnetic radiation, over any range of wavelengths, given an appropriate combination of scene and detectors. The scene need not be inhomogeneous in temperature, it may, for example, have inhomogeneities in a trace gas or gases that have characteristic spectral lines which are detectable at a focal plane. Oscillating the instrument FOV allows detection of this sort of scene inhomogeneity, as well.

Figure 4:
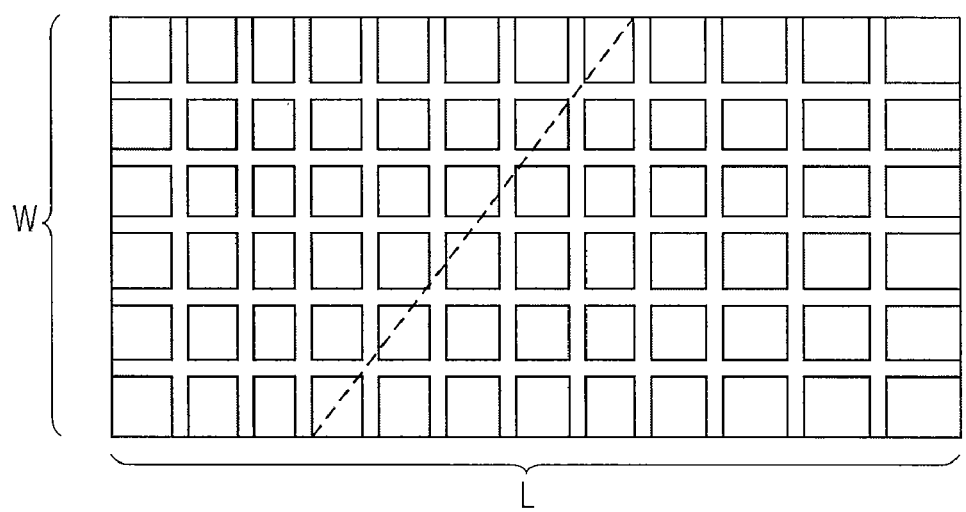
FIG. 4 is an exemplary view of a field-of-view (FOV) seen by an optical instrument, when viewing a scene through a grid, in accordance with an embodiment of the present invention.

When the scene inhomogeneity does not have the form shown in FIG. 1, oscillating the LOS still produces a signal, so long as regions of greater or lesser temperatures or trace-gas concentrations move into and out of the scene at the FOV edges. To increase the likelihood that this happens, the system may increase the number of "edges" in the FOV, by looking at a scene through a grid. FIG. 4 provides one example of such a grid. Each grid boundary in FIG. 4 behaves like a FOV edge, producing an enhanced signal as inhomogeneous scene regions move back and forth across the extra edges created by the grid.

Instead of using a grid, the system may replace the single detector in focal plane A of FIG. 2 by an array of detectors. The system may sum up their signals to get an SNR large enough to measure small scene inhomogeneities. The system may also measure inhomogeneity on an even smaller scale, by examining the individual output of each detector in the array for an oscillating signal.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of measuring scene inhomogeneity comprising the steps of:
    (a) directing radiance of a scene onto a focal plane;
    (b) changing a line-of-sight (LOS) of the directed radiance, while performing step (a);
    (c) detecting the radiance of the scene to obtain a signal;
    (d) measuring an amplitude of the signal; and
    (e) determining scene inhomogeneity based on the measured amplitude of the signal.

2. The method of claim 1 wherein
    step (b) includes uniformly oscillating the LOS using an oscillating mirror; and
    step (c) includes obtaining a sinusoidal signal based on the step of uniformly oscillating the LOS.

3. The method of claim 1 wherein
    step (b) includes using a periodic waveform to change the LOS of the directed radiance; and
    step (c) includes obtaining a signal having a periodic waveform based on the step of changing the LOS.

4. The method of claim 3 wherein
    step (b) includes changing the LOS using a sinusoidal waveform, a pulse code modulated waveform, or a pseudo-random waveform; and
    step (c) includes obtaining a signal having a period waveform proportional to the periodic waveform used to change the LOS.

5. The method of claim 1 wherein
    detecting the radiance includes detecting the radiance by disposing a focal planar array (FPA) at the focal plane.

6. The method of claim 1 wherein
    step (b) includes oscillating a dichroic mirror, while receiving and reflecting the radiance of the scene onto the focal plane.

7. The method of claim 6 wherein
    step (b) includes oscillating the dichroic mirror, and transmitting a portion of the radiance of the scene toward an optical sounder device.

8. The method of claim 1 wherein
    step (e) includes determining that the scene is inhomogeneous, when the measured amplitude of the signal is larger than a noise component of the signal.

9. The method of claim 1 wherein
    step (e) includes determining that the scene is homogeneous, when the measured amplitude of the signal is equal to or smaller than a noise component of the signal.

10. An optical system for measuring scene inhomogeneity comprising
    a mirror for receiving radiance of a field-of-view (FOV) of a scene, and reflecting a portion of the radiance to an optical detector,
    a controller coupled to the mirror for changing the FOV,
    the optical detector providing a signal of the reflected portion of radiance of the scene, and
    a processor for determining scene inhomogeneity, based on amplitude of the signal provided from the optical detector.

11. The system of claim 10 wherein
    the controller is configured to change the FOV at a periodic interval, using one of a sinusoidal waveform, a pulse code modulated waveform, or a pseudo-random waveform, and
    the processor is configured to determine scene inhomogeneity, based on the signal provided from the optical detector having a waveform corresponding to the respective sinusoidal waveform, the pulse code modulated waveform, or the pseudo-random waveform.

12. The system of claim 10 wherein
    the optical detector includes a focal planar array (FPA) for detecting the radiance of the scene and providing multiple output signals from the FPA, and
    the processor includes an adder for summing the multiple output signals from the FPA.

13. The system of claim 10 wherein
    the processor is configured to determine that the scene is inhomogeneous, when the amplitude of the signal is larger than a noise component of the signal, and
    the processor is configured to determine that the scene is homogeneous, when the measured amplitude of the signal is equal to or smaller than the noise component of the signal.

14. The system of claim 10 wherein
the processor includes a module for calculating a Fourier transform of the signal provided from the optical detector.

15. The system of claim 10 further including
a sounder system for receiving another portion of the radiance of the scene,
wherein the other portion of the radiance is transmitted through the mirror toward the sounder system.

16. A system for determining scene inhomogeneity comprising
a mirror for receiving and reflecting radiance of a scene toward an optical detector,
a controller for oscillating the mirror at a predetermined frequency, while receiving and reflecting the radiance of the scene, and
the optical detector including a focal planar array (FPA) for detecting the radiance of the scene,
wherein the optical detector provides a signal proportional to the predetermined frequency, and
the signal is used to determine scene inhomogeneity.

17. The system of claim 16 including
aft optics disposed between the mirror and the optical detector for focusing the radiance of the scene onto the FPA.

18. The system of claim 16 including
a motor configured to oscillate the mirror at the predetermined frequency, and
a controller for synchronizing the motor at the predetermined frequency and synchronizing the signal at the predetermined frequency.

19. The system of claim 16 including
a processor coupled to the FPA, wherein
the processor is configured to determine that the scene is inhomogeneous, when an amplitude of the signal is larger than a noise component of the signal.

20. The system of claim 19 wherein
the processor is configured to determine that the scene is homogeneous, when the measured amplitude of the signal is equal to or smaller than the noise component of the signal.

* * * * *